(12) United States Patent
Deshpande et al.

(10) Patent No.: US 11,496,761 B2
(45) Date of Patent: Nov. 8, 2022

(54) SYSTEMS AND METHODS FOR SIGNALING PICTURE TYPES OF PICTURES INCLUDED IN CODED VIDEO

(71) Applicants: Sharp Kabushiki Kaisha, Sakai (JP); FG Innovation Company Limited, New Territories (HK)

(72) Inventors: Sachin G. Deshpande, Vancouver, WA (US); Byeongdoo Choi, Vancouver, WA (US)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 17/254,398

(22) PCT Filed: Jun. 25, 2019

(86) PCT No.: PCT/JP2019/025237
§ 371 (c)(1),
(2) Date: Dec. 21, 2020

(87) PCT Pub. No.: WO2020/004420
PCT Pub. Date: Jan. 2, 2020

(65) Prior Publication Data
US 2021/0281868 A1    Sep. 9, 2021

Related U.S. Application Data

(60) Provisional application No. 62/698,341, filed on Jul. 16, 2018, provisional application No. 62/692,731, filed on Jun. 30, 2018.

(51) Int. Cl.
*H04N 19/44* (2014.01)
*H04N 19/184* (2014.01)
(Continued)

(52) U.S. Cl.
CPC .......... *H04N 19/44* (2014.11); *H04N 19/184* (2014.11); *H04N 19/188* (2014.11); *H04N 19/70* (2014.11)

(58) Field of Classification Search
CPC .... H04N 19/44; H04N 19/188; H04N 19/184; H04N 19/70
See application file for complete search history.

(56) References Cited

U.S. PATENT DOCUMENTS

2014/0301477 A1* 10/2014 Deshpande ............ H04N 19/70
375/240.25
2014/0376618 A1* 12/2014 Ma ........................ H04N 19/46
375/240.03
(Continued)

FOREIGN PATENT DOCUMENTS

CN           105592368 A        5/2016

OTHER PUBLICATIONS

Official Communication issued in International Patent Application No. PCT/JP2019/025237, dated Aug. 6, 2019.
(Continued)

*Primary Examiner* — Richard A Hansell, Jr.
(74) *Attorney, Agent, or Firm* — Keating & Bennett, LLP

(57) ABSTRACT

This disclosure relates to video coding and more particularly to techniques for signaling a picture type in coded video. According to an aspect of an invention, 4 bits NAL unit type information in a NAL unit header is decoded; and a NAL unit type indicating that a content of a NAL unit is trailing picture is determined.

6 Claims, 6 Drawing Sheets

(51) Int. Cl.
*H04N 19/169* (2014.01)
*H04N 19/70* (2014.01)

(56) References Cited

U.S. PATENT DOCUMENTS

| | | | | |
|---|---|---|---|---|
| 2016/0255373 | A1* | 9/2016 | Deshpande | H04N 19/46 375/240.25 |
| 2017/0134742 | A1* | 5/2017 | Deshpande | H04N 19/184 |
| 2018/0063543 | A1* | 3/2018 | Reddy | H04N 19/70 |
| 2021/0297705 | A1* | 9/2021 | Sjöberg | H04N 19/179 |

OTHER PUBLICATIONS

Brass et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, JCTVC-L1003_v34, Jan. 14-23, 2013, 6 pages.

Brass, "Versatile Video Coding (Draft 1)", Joint Video Experts Team (JVET) of ITU-T SG 16 WP 3 and ISO/IEC JTC 1/SC 29/WG 11, JVET-J1001-v2, Apr. 10-20, 2018, 43 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 51 pages.

"High efficiency video coding"; Telecommunication Standardization Sector of International Telecommunication Union (ITU-T); Series H: Audiovisual and Multimedia Systems; Infrastructure of audiovisual services—Coding of moving video; H.265; Dec. 2016; 662 pages.

"Advanced video coding for generic audiovisual services"; Telecommunication Standardization Sector of International Telecommunication Union (ITU-T); Series H: Audiovisual and Multimedia Systems; Infrastructure of audiovisual services—Coding of moving video; H.264; Apr. 2017; 810 pages.

* cited by examiner

SYSTEMS AND METHODS FOR SIGNALING PICTURE TYPES OF PICTURES INCLUDED IN CODED VIDEO

CROSS REFERENCE

This Nonprovisional application claims priority under 35 U.S.C. § 119 on provisional Application No. 62/692,731 on Jun. 30, 2018, No. 62/698,341 on Jul. 16, 2018, the entire contents of which are hereby incorporated by reference.

TECHNICAL FIELD

This disclosure relates to video coding and more particularly to techniques for signaling of pictures types in coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding were proposed by various groups at the $10^{th}$ Meeting of ISO/IEC JTC1/SC29/WG11 16-20 Apr. 2018, San Diego, Calif. As a result of the multiple descriptions of video coding, a draft text of a video coding specification is described in "Versatile Video Coding (Draft 1)," $10^{th}$ Meeting of ISO/IEC JTC1/SC29/WG11 16-20 Apr. 2018, San Diego, Calif., document JVET-J1001-v2, which is incorporated by reference herein, and referred to as JVET-J1001.

Video compression techniques reduce data requirements for storing and transmitting video data by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream. Compliant bitstreams and associated metadata may be formatted according to data structures.

SUMMARY OF INVENTION

In one example, a method for decoding a video data comprises receiving a network abstraction layer (NAL) unit header, decoding 4 bits NAL unit type information in the NAL unit header, and determining a NAL unit type indicating that a content of a NAL unit is trailing picture based on the NAL unit header.

DESCRIPTION OF EMBODIMENTS

Figure 1:
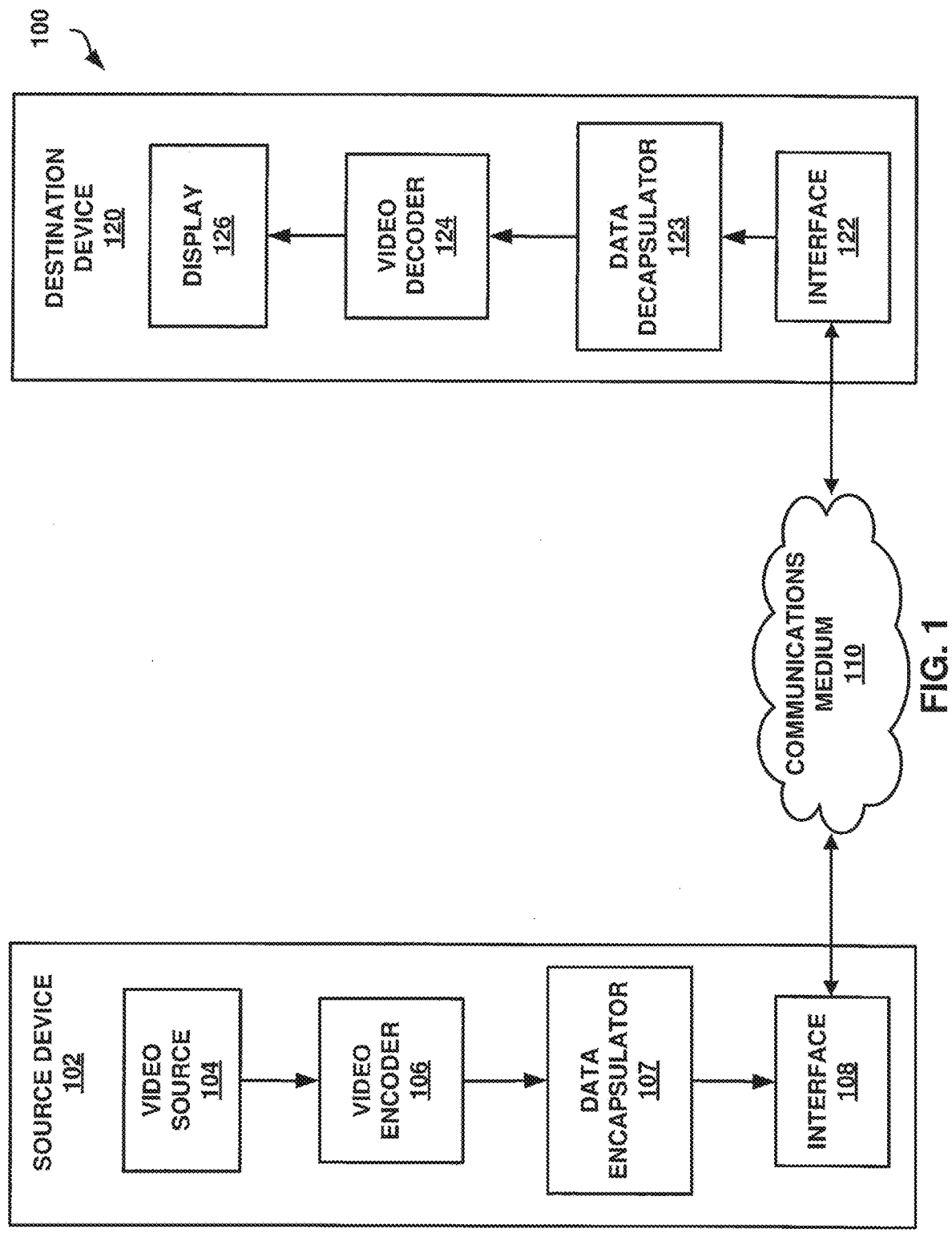
FIG. 1 is a block diagram illustrating an example of a system that may be configured to encode and decode video data according to one or more techniques of this this disclosure.

In general, this disclosure describes various techniques for coding video data. In particular, this disclosure describes techniques for signaling of picture types of coded video. Signaling of picture types according to the techniques described herein may be particularly useful for improving video distribution system performance by lowering transmission bandwidth and/or facilitating parallelization of a video encoder and/or decoder. It should be noted that although techniques of this disclosure are described with respect to ITU-T H.264, ITU-T H.265, and JVET-J1001 the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264, ITU-T H.265, and JVET-J1001 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device comprises one or more processors configured to signal a value for a syntax element in a network abstraction layer header indicating a network abstraction layer includes a slice of video included in an intra random access point picture, and signal a value for syntax element in a slice header indicating a corresponding type of intra random access point picture.

In one example, a non-transitory computer-readable storage medium comprises instructions stored thereon that, when executed, cause one or more processors of a device to signal a value for a syntax element in a network abstraction layer header indicating a network abstraction layer includes a slice of video included in an intra random access point picture, and signal a value for syntax element in a slice header indicating a corresponding type of intra random access point picture.

In one example, an apparatus comprises means for signaling a value for a syntax element in a network abstraction layer header indicating a network abstraction layer includes a slice of video included in an intra random access point picture, and means for signaling a value for syntax element in a slice header indicating a corresponding type of intra random access point picture.

In one example, a device comprises one or more processors configured to parse a value for a syntax element in a network abstraction layer header indicating a network abstraction layer includes a slice of video included in an intra random access point picture, parse a value for syntax element in a slice header indicating a corresponding type of intra random access point picture, and generate video data based on values of the parsed syntax elements.

In one example, a non-transitory computer-readable storage medium comprises instructions stored thereon that, when executed, cause one or more processors of a device to parse a value for a syntax element in a network abstraction layer header indicating a network abstraction layer includes a slice of video included in an intra random access point picture, parse a value for syntax element in a slice header indicating a corresponding type of intra random access point picture, and generate video data based on values of the parsed syntax elements.

In one example, an apparatus comprises means for parsing a value for a syntax element in a network abstraction layer header indicating a network abstraction layer includes a slice of video included in an intra random access point picture, means for parsing a value for syntax element in a slice header indicating a corresponding type of intra random access point picture, and means for generating video data based on values of the parsed syntax elements.

The details of one or more examples are set forth in the accompanying drawings and the description below. Other features, objects, and advantages will be apparent from the description and drawings, and from the claims.

Video content typically includes video sequences comprised of a series of frames. A series of frames may also be referred to as a group of pictures (GOP). Each video frame or picture may include a one or more slices, where a slice includes a plurality of video blocks. A video block includes an array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure (which may be referred to as a Largest Coding Unit (LCU)) where a picture may be split into CTUs of equal size and each CTU may include Coding Tree Blocks (CTB) having 16×16, 32×32, or 64×64 luma samples. As used herein, the term video block may generally refer to an area of a picture or may more specifically refer to the largest array of pixel values that may be predictively coded, sub-divisions thereof, and/or corresponding structures. Further, according to TTU-T H.265, each video frame or picture may be partitioned to include one or more tiles, where a tile is a sequence of coding tree units corresponding to a rectangular area of a picture.

In ITU-T H.265, a CTU is composed of respective CTBs for each component of video data (e.g., luma (Y) and chroma (Cb and Cr)). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB sizes type include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
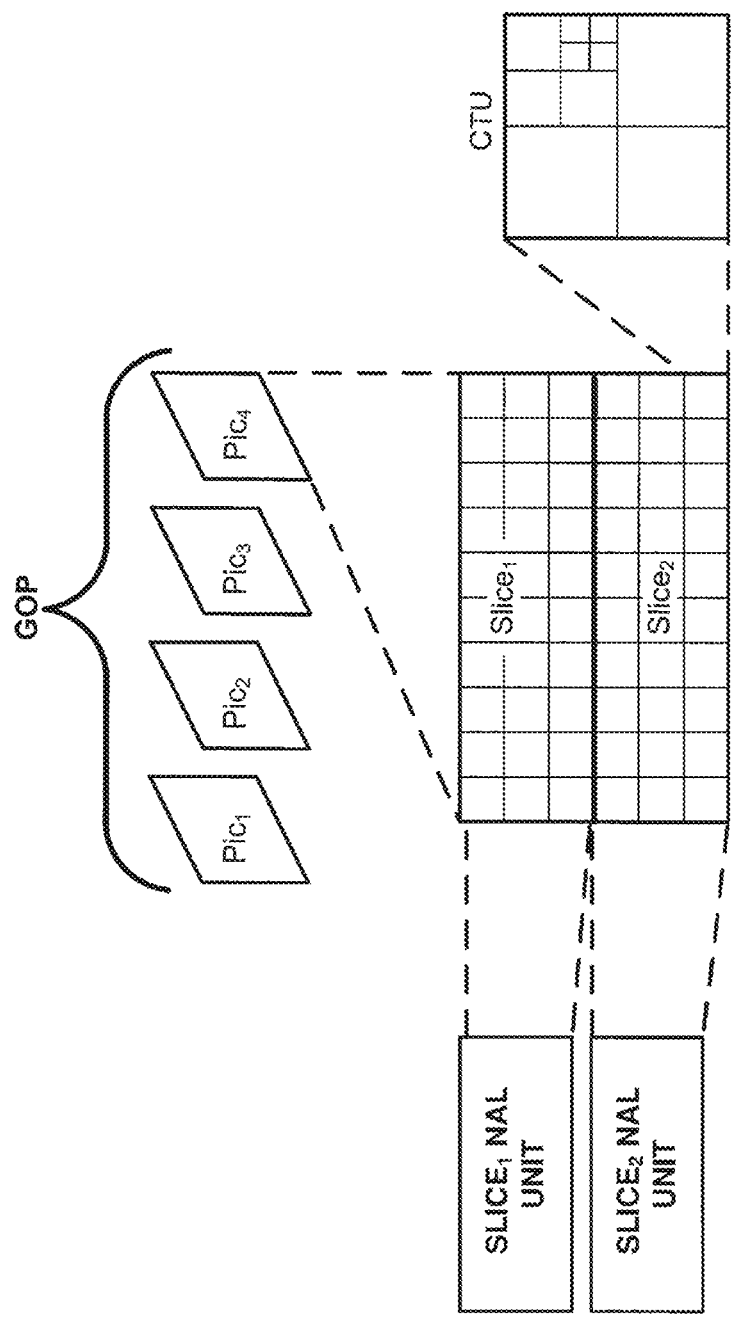
FIG. 2 is a conceptual diagram illustrating coded video data and corresponding data structures according to one or more techniques of this this disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. Thus, the binary tree structure in JEM enables square and rectangular leaf nodes, where each leaf node includes a CB. As illustrated in FIG. 2, a picture included in a GOP may include slices, where each slice includes a sequence of CTUs and each CTU may be partitioned according to a QTBT structure. In JEM, CBs are used for prediction without any further partitioning. That is, in JEM, a CB may be a block of sample values on which the same prediction is applied. Thus, a JEM QTBT leaf node may be analogous a PB in ITU-T H.265.

Intra prediction data (e.g., intra prediction mode syntax elements) or inter prediction data (e.g., motion data syntax elements) may associate PUs with corresponding reference samples. Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, an array of pixel difference values may be sub-divided for purposes of generating transform coefficients (e.g., four 8×8 transforms may be applied to a 16×16 array of residual values corresponding to a 16×16 luma CB), such sub-divisions may be referred to as Transform Blocks (TBs). Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP), Spatial-temporal motion vector prediction (STMVP), Pattern matched motion vector derivation (PMMVD) mode, which is a special merge mode based on Frame-Rate Up Conversion (FRUC) techniques, and affine transform motion compensation prediction.

Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. In ITU-T H.265, a CU is associated with a transform unit (TU) structure having its root at the CU level. That is, in ITU-T H.265, as described above, an array of difference values may be sub-divided for purposes of generating transform coefficients (e.g., four 8×8 transforms may be applied to a 16×16 array of residual values). It should be noted that in ITU-T H.265, TBs are not necessarily aligned with PBs.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization approximates transform coefficients by amplitudes restricted to a set of specified values. Quantization may be used in order to vary the amount of data required to represent a group of transform coefficients.

Quantization may be realized through division of transform coefficients by a scaling factor and any associated rounding functions (e.g., rounding to the nearest integer). Quantized transform coefficients may be referred to as coefficient level values. Inverse quantization (or "dequantization") may include multiplication of coefficient level values by the scaling factor. It should be noted that as used herein the term quantization process in some instances may refer to division by a scaling factor to generate level values or multiplication by a scaling factor to recover transform coefficients in some instances. That is, a quantization process may refer to quantization in some cases and inverse quantization in some cases.

With respect to the equations used herein, the following arithmetic operators may be used:

+ Addition
− Subtraction
\* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.
Further, the following mathematical functions may be used:
Log 2(x) the base-2 logarithm of x;

$$\mathrm{Min}(x, y) = \begin{cases} x & ; \ x <= y \\ y & ; \ x > y \end{cases};$$

$$\mathrm{Max}(x, y) = \begin{cases} x & ; \ x >= y \\ y & ; \ x < y \end{cases}$$

Ceil(x) the smallest integer greater than or equal to x.
With respect to the example syntax used herein, the following definitions of logical operators may be applied:
x && y Boolean logical "and" of x and y
x || y Boolean logical "or" of x and y
! Boolean logical "not"
x ? y: z If x is TRUE or not equal to 0, evaluates to the value of y; otherwise, evaluates to the value of z.
Further, the following relational operators may be applied:
> Greater than
>= Greater than or equal to
< Less than
<= Less than or equal to
== Equal to
!= Not equal to
Further, it should be noted that in the syntax descriptors used herein, the following descriptors may be applied:
f(n): fixed-pattern bit string using n bits written (from left to right) with the left bit first. The parsing process for this descriptor is specified by the return value of the function read_bits(n)
u(n): unsigned integer using n bits.
ue(v): unsigned integer 0-th order Exp-Golomb-coded syntax element with the left bit first.

As described above, according to ITU-T H.265, each video frame or picture may be partitioned to include one or more slices and further partitioned to include one or more tiles. FIG. 2 is a conceptual diagram illustrating an example of a group of pictures including slices. In the example illustrated in FIG. 2, Pic4 is illustrated as including two slices (i.e., Slice1 and Slice2) where each slice includes a sequence of CTUs (e.g., in raster scan order). It should be noted that a slice is a sequence of one or more slice segments starting with an independent slice segment and containing all subsequent dependent slice segments (if any) that precede the next independent slice segment (if any) within the same access unit. A slice segment, like a slice, is a sequence of coding tree units. In the examples described herein, in some cases the terms slice and slice segment may be used interchangeably to indicate a sequence of coding tree units. It should be noted that in ITU-T H.265, a tile may consist of coding tree units contained in more than one slice and a slice may consist of coding tree units contained in more than one tile. However, ITU-T H.265 provides that one or both of the following conditions shall be fulfilled: (1) All coding tree units in a slice belong to the same tile; and (2) All coding tree units in a tile belong to the same slice. Tile sets may be used to define boundaries for coding dependencies (e.g., intra-prediction dependencies, entropy encoding dependencies, etc.) and as such, may enable parallelism in coding.

In ITU-T H.265, a coded video sequence (CVS) may be encapsulated (or structured) as a sequence of access units, where each access unit includes video data structured as network abstraction layer (NAL) units. In ITU-T H.265, a bitstream is described as including a sequence of NAL units forming one or more CVSs. It should be noted that ITU-T H.265 supports multi-layer extensions, including format range extensions (RExt), scalability (SHVC), multi-view (MV-HEVC), and 3-D (3D-HEVC). Multi-layer extensions enable a video presentation to include a base layer and one or more additional enhancement layers. For example, a base layer may enable a video presentation having a basic level of quality (e.g., High Definition rendering) to be presented and an enhancement layer may enable a video presentation having an enhanced level of quality (e.g., an Ultra High Definition rendering) to be presented. In ITU-T H.265, an enhancement layer may be coded by referencing a base layer. That is, for example, a picture in an enhancement layer may be coded (e.g., using inter prediction techniques) by referencing one or more pictures (including scaled versions thereof) in a base layer. In ITU-T H.265, each NAL unit may include an identifier indicating a layer of video data the NAL unit is associated with. It should be noted that sub-bitstream extraction may refer to a process where a device receiving a compliant bitstream forms a new compliant bitstream by discarding and/or modifying data in the received bitstream. For example, sub-bitstream extraction may be used to form a new compliant bitstream corresponding to a particular representation of video (e.g., a high quality representation).

Referring to the example illustrated in FIG. 2, each slice of video data included in Pic4 (i.e., Slice1 and Slice2) is illustrated as being encapsulated in a NAL unit. In ITU-T H.265, each of a video sequence, a GOP, a picture, a slice, and CTU may be associated with metadata that describes video coding properties. ITU-T H.265 defines parameters sets that may be used to describe video data and/or video coding properties. In ITU-T H.265, parameter sets may be encapsulated as a special type of NAL unit or may be signaled as a message. NAL units including coded video data (e.g., a slice) may be referred to as VCL (Video Coding Layer) NAL units and NAL units including metadata (e.g., parameter sets) may be referred to as non-VCL NAL units. Further, ITU-T H.265 enables supplemental enhancement information (SEI) messages to be signaled. In ITU-T H.265, SEI messages assist in processes related to decoding, display or other purposes, however, SEI messages may not be required for constructing the luma or chroma samples by the decoding process. In ITU-T H.265, SEI messages may be signaled in a bitstream using non-VCL NAL units. Further, SEI messages may be conveyed by some means other than by being present in the bitstream (i.e., signaled out-of-band).

Figure 3:
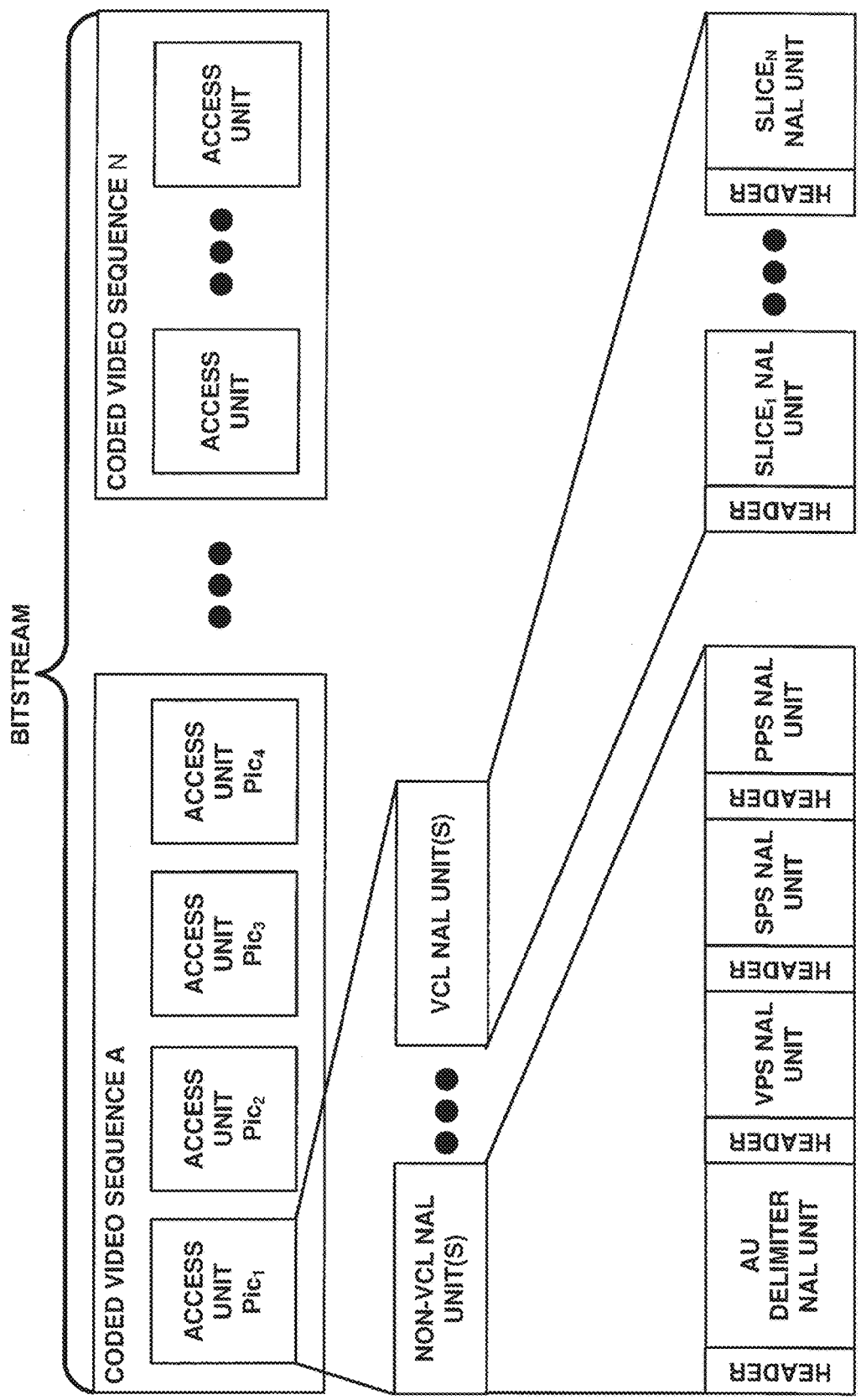
FIG. 3 is a conceptual diagram illustrating a data structure encapsulating coded video data and corresponding metadata according to one or more techniques of this this disclosure.

FIG. 3 illustrates an example of a bitstream including multiple CVSs, where a CVS is represented by NAL units included in a respective access unit. In the example illustrated in FIG. 3, non-VCL NAL units include respective parameter set units (i.e., Video Parameter Sets (VPS), Sequence Parameter Sets (SPS), and Picture Parameter Set (PPS) units) and an access unit delimiter NAL unit. ITU-T H.265 defines NAL unit header semantics that specify the type of Raw Byte Sequence Payload (RBSP) data structure included in the NAL unit. Table 1 illustrates the syntax of the NAL unit header in ITU-T H.265.

TABLE 1

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

ITU-T H.265 provides the following definitions for the respective syntax elements illustrated in Table 1.

forbidden_zero_bit shall be equal to 0.

nuh_layer_id specifies the identifier of the layer to which a VCL NAL unit belongs or the identifier of a layer to which a non-VCL NAL unit applies.

nuh_temporal_id_plus1 minus 1 specifies a temporal identifier for the NAL unit. The value of nuh_temporal_id_plus1 shall not be equal to 0

With respect to nal_unit_type, nal_unit_type specifies the type of RBSP data structure contained in the NAL unit. Table 2 illustrates the NAL unit types provided in ITU-T H.265.

TABLE 2

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |
| 4 | STSA_N | Coded slice segment of a STSA picture slice_segment_layer_rbsp( ) | VCL |
| 5 | STSA_R | | |
| 6 | RADL_N | Coded slice segment of a random access decodable leading (RADL) picture slice_segment_layer_rbsp( ) | VCL |
| 7 | RADL_R | | |
| 8 | RASL_N | Coded slice segment of a random access skipped leading (RASL) picture slice_segment_layer_rbsp( ) | VCL |
| 9 | RASL_R | | |
| 10 | RSV_VCL_N10 | Reserved non-IRAP SLNR VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of a IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved TRAP VCL NAL unit types | VCL |
| 23 | RSV_IRAP_VCL23 | | |
| 24 ... 31 | RSV_VCL24 ... RSV_VCL31 | Reserved non-TRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter Access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |

TABLE 2-continued

| nal_unit_type | Name of nal_unit_type | Content of NAL unit and RBSP syntax structure | NAL unit type class |
|---|---|---|---|
| 41 ... 47 | RSV_NVCL41 ... RSV_NVCL47 | Reserved | non-VCL |
| 48 ... 63 | UNSPEC48 ... UNSPEC63 | Unspecified | non-VCL |

For the sake of brevity, a complete description of each of the NAL units types in ITU-T H.265 is not provided herein. However, reference is made to the relevant sections of ITU-T H.265. It should be noted that ITU-T H.265 provides the following definition of an IRAP picture:

intra random access point (IRAP) picture: A coded picture for which each VCL NAL unit has nal_unit_type in the range of BLA_W_LP to RSV_IRAP_VCL23, inclusive.

NOTE—An IRAP picture does not refer to any pictures other than itself for inter prediction in its decoding process, and may be a BLA picture, a CRA picture or an IDR picture. The first picture in the bitstream in decoding order must be an IRAP picture. Provided the necessary parameter sets are available when they need to be activated, the TRAP picture and all subsequent non-RASL pictures in decoding order can be correctly decoded without performing the decoding process of any pictures that precede the IRAP picture in decoding order. There may be pictures in a bitstream that do not refer to any pictures other than itself for inter prediction in its decoding process that are not IRAP pictures.

Thus, in ITU-T H.265 there are several NAL unit types for IRAP pictures (i.e., BLA_W_LP to RSV_I-RAP_VCL23). Further, ITU-T H.265 provides the following respective definitions leading pictures, trailing pictures, and temporal sub-layer access pictures:

leading picture: A picture that precedes the associated IRAP picture in output order.

trailing picture: A non-IRAP picture that follows the associated IRAP picture in output order.

NOTE—Trailing pictures associated with an IRAP picture also follow the IRAP picture in decoding order. Pictures that follow the associated IRAP picture in output order and precede the associated IRAP picture in decoding order are not allowed.

temporal sub-layer access (TSA) picture: A coded picture for which each VCL NAL unit has nal_unit_type equal to TSA_R or TSA_N.

NOTE—A TSA picture and pictures following the TSA picture in decoding order do not use pictures prior to the TSA picture in decoding order with TemporalId greater than or equal to that of the TSA picture for inter prediction reference. A TSA picture enables up-switching, at the TSA picture, to the sub-layer containing the TSA picture or any higher sublayer, from the immediately lower sub-layer. TSA pictures must have TemporalId greater than 0.

Thus, as illustrated in Table 2, ITU-T H.265 provides four NAL units types for leading pictures (RADL_N, RADL_R, RASL_N, and RASL_R), two NAL unit types for trailing pictures (TRAIL_N and TRAIL_R), and two NAL unit types for temporal sub-layer access pictures (TSA_N and TSA_R).

As described above, JVET-J1001 is a draft text of a video coding specification. Table 3 illustrates the syntax of the NAL unit header in JVET-J1001.

TABLE 3

| nal_unit_header( ) { | Descriptor |
|---|---|
| forbidden_zero_bit | f(1) |
| nal_unit_type | u(6) |
| } | |

JVET-J1001 provides the following definitions for the respective syntax elements illustrated in Table 3.

forbidden_zero_bit shall be equal to 0.

With respect to nal_unit_type, JVET-J1001 provides where the NAL unit types are yet to be defined. It should be noted however that JVET-J1001 provides the slice head syntax illustrated in Table 4.

TABLE 4

| slice_header( ) { | Descriptor |
|---|---|
| slice_pic_parameter_set_id | ue(v) |
| slice_address | u(v) |
| slice_type | ue(v) |
| if( slice type != I ) | |
| log2_diff_ctu_max_bt_size | ue(v) |
| byte_alignment( ) | |
| } | |

JVET-J1001 provides the following definitions for the respective syntax elements illustrated in Table 4.

slice_pic_parameter_set_id specifies the value of pps_pic_parameter_set_id for the PPS in use. The value of slice_pic_parameter_set_id shall be in the range of 0 to 63, inclusive.

slice_address specifies the address of the first CTB in the slice, in CTB raster scan of a picture. The length of the slice_address syntax element is Ceil(Log2(PicSizeInCtbsY)) bits. The value of slice_address shall be in the range of 0 to PicSizeInCtbsY−1, inclusive, and the value of slice_address shall not be equal to the value of slice_address of any other coded slice NAL unit of the same coded picture.

The variable CtbAddrInRs, specifying a CTB address in CTB raster scan of a picture, is set equal to slice_address.

slice_type specifies the coding type of the slice according to Table 5.

TABLE 5

| slice_type | Name of slice_type |
|---|---|
| 0 | B (B slice) |
| 1 | P (P slice) |
| 2 | I (I slice) |

When nal_unit_type has a value in the range of [to be determined], inclusive, i.e., the picture is an IRAP picture, slice_type shall be equal to 2.

log2_diff_ctu_max_bt_size specifies the difference between the luma CTB size and the maximum luma size (width or height) of a coding block that can be split using a binary split. The value of log2_diff_ctu_max_bt_size shall be in the range of 0 to CtbLog2SizeY−MinCbLog2SizeY, inclusive.

It should be noted that a B slice refers to a slice where bi-prediction inter prediction, uni-prediction inter prediction, and intra predication are allowed; a P slice refers to a slice where uni-prediction inter prediction, and intra predication are allowed; and a I slice refers where only intra predication is allowed. It should be noted that in some cases B and P slices are collectively referred to as inter slices.

This disclosure describes NAL unit syntax and semantics and slice level syntax and semantics for signaling picture types and the like. Further, according to the techniques described herein, a video encoder may signal picture types and the like using the syntax and semantics described herein. A video decoder may determine picture types and the like by parsing signaling that uses the syntax and semantics described herein and perform video decoding based on the parsed signaling.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
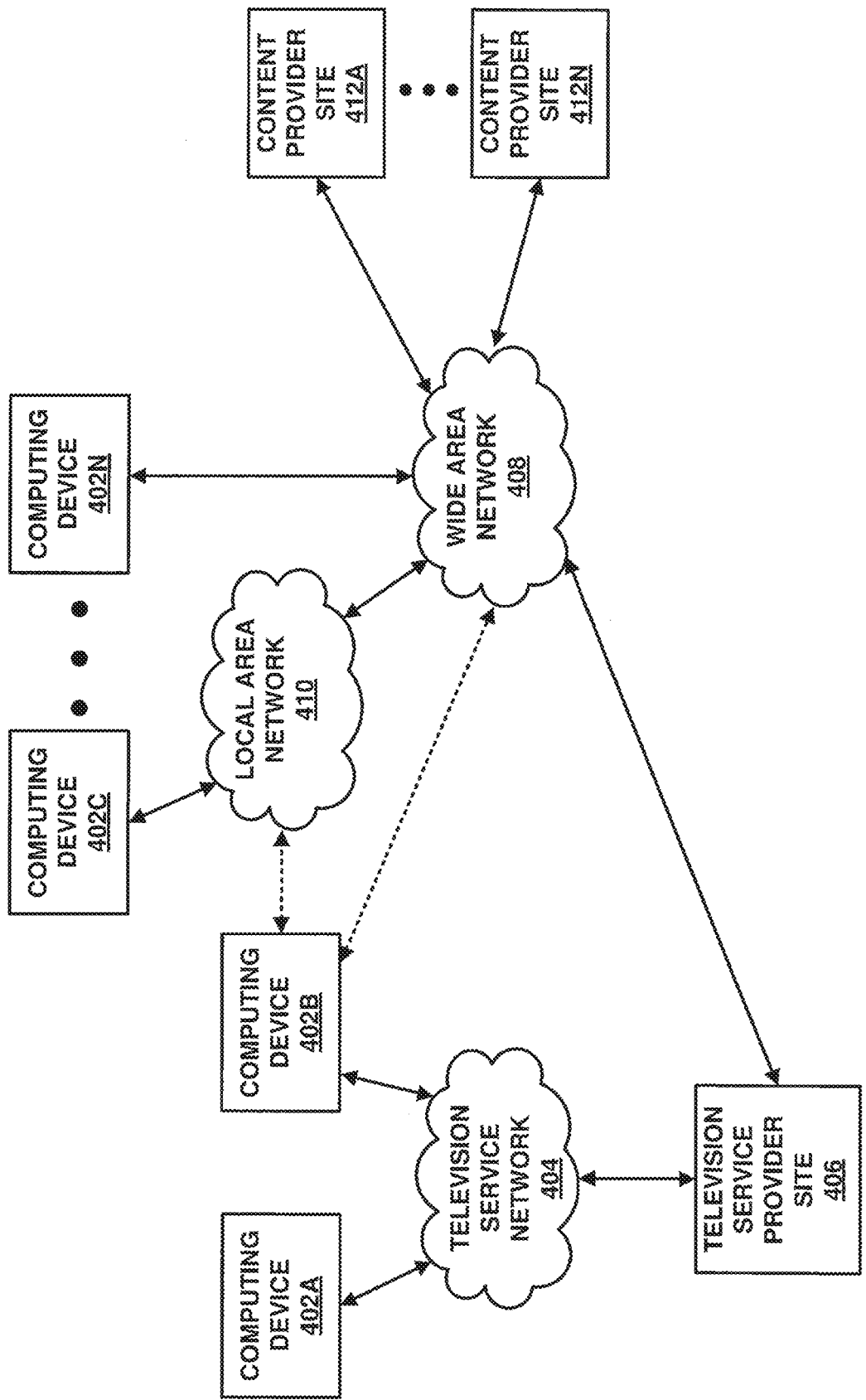
FIG. 4 is a conceptual drawing illustrating an example of components that may be included in an implementation of a system that may be configured to encode and decode video data according to one or more techniques of this this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
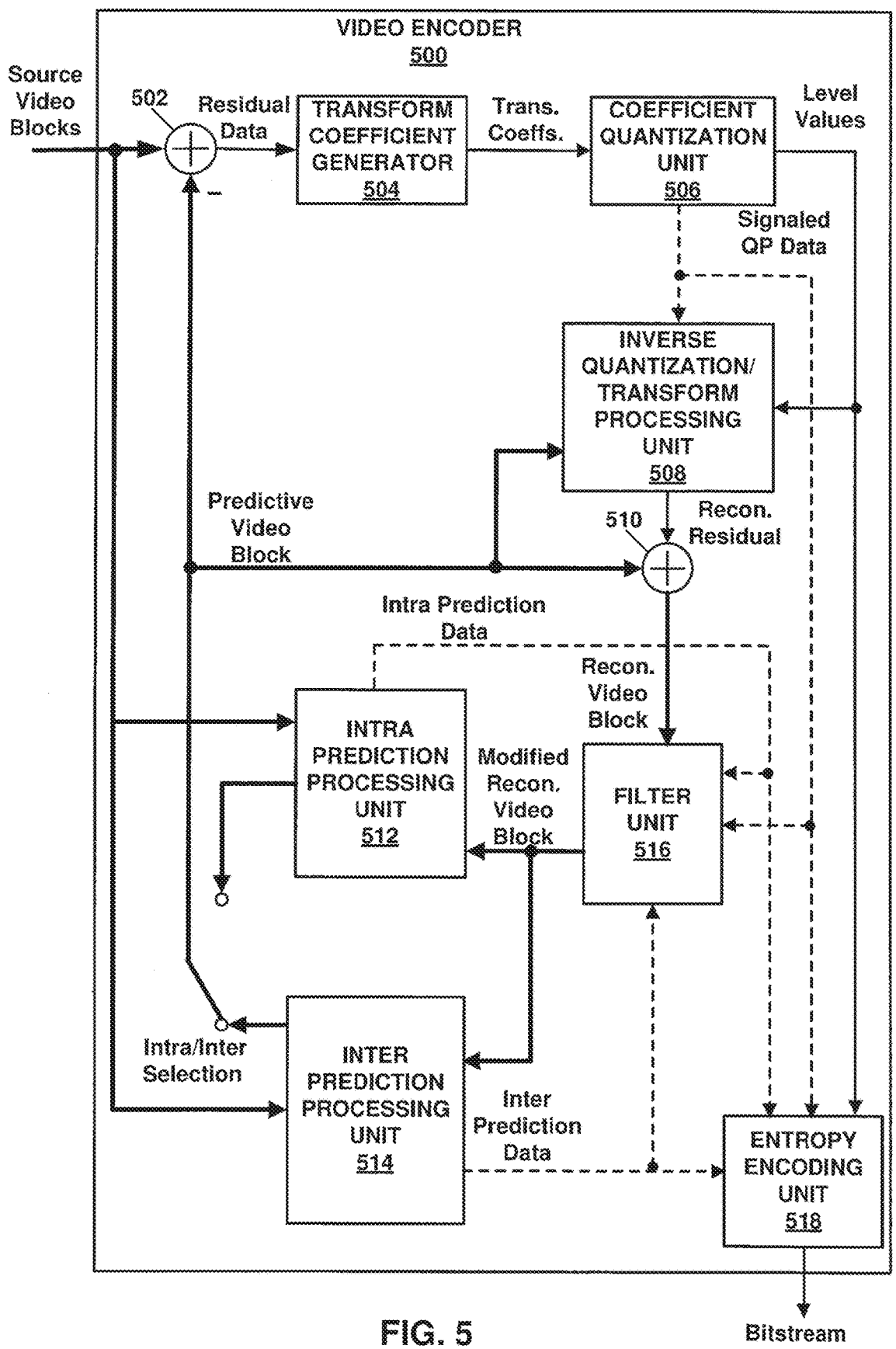
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a predication mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclose.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream.

As described above, ITU-T H.265 provides several NAL unit types for IRAP pictures, four NAL units types for leading pictures, two NAL unit types for trailing pictures (TRAIL_N and TRAIL_R), two NAL unit types for temporal sub-layer access pictures (TSA_N and TSA_R) and two NAL unit types for step-wise temporal sub-layer access pictures (STSA_N and STSA_R). Supporting each of these NAL units types results in a NAL unit header which is overly complex. In one example, data encapsulator 107 may be configured to generate a simplified NAL unit header and/or slice level syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

In one example, according to the techniques described herein, data encapsulator 107 may be configured to signal a NAL unit header based on the example syntax provided in Tables 6A-6C:

TABLE 6A

| nal_unit_header( ) { | Descriptor |
|---|---|
| forbidden_zero_bit | f(1) |
| nuh_temporal_id_plus1 | u(3) |
| nal_unit_type | u(4) |
| nuh_reserved_zero_bits | u(2) |
| nuh_layer_id OR nuh_reserved_zero_6bits | u(6) |
| } | |

TABLE 6B

| nal_unit_header( ) { | Descriptor |
|---|---|
| forbidden_zero_bit | f(1) |
| nuh_temporal_id_plus1 | u(3) |
| nal_unit_type | u(5) |
| nuh_reserved_zero_bits | u(1) |
| nuh_layer_id OR nuh_reserved_zero_6bits | u(6) |
| } | |

TABLE 6C

| nal_unit_header( ) { | Descriptor |
|---|---|
| forbidden_zero_bit | f(1) |
| nuh_temporal_id_plus1 | u(3) |
| nal_unit_type | u(6) |
| nuh_layer_id OR nuh_reserved_zero_6bits | u(6) |
| } | |

As illustrated, Tables 6A-6C, provide examples of 16-bit NAL units headers where nal_unit_type includes 4, 5, or 6 bits. In another example, only 8-bits may be used for a NAL unit header and a NAL unit header may include 4 bits for nal_unit_type as shown in Table 6D.

TABLE 6D

| nal_unit_header( ) { | Descriptor |
|---|---|
| forbidden_zero_bit | f(1) |
| nuh_temporal_id_plus1 | u(3) |
| nal_unit_type | u(4) |
| } | |

In one example, if 5-bits or 6-bits are used for nal_unit_type, then the position of syntax elements nal_unit_type, nuh_layer_id, nuh_temporal_id_plus1, or the syntax elements provided for reserved bits may be changed. Tables 7A and 7B illustrates examples where 5 bits are used for nal_unit_type.

TABLE 7A

| nal_unit_header( ) { | Descriptor |
|---|---|
| forbidden_zero_bit | f(1) |
| nuh_temporal_id_plus1 | u(3) |
| nal_unit_type | u(5) |
| nuh_reseryed_zero_7bits | u(7) |
| } | |

TABLE 7B

| nal_unit_header( ) { | Descriptor |
|---|---|
| forbidden_zero_bit | f(1) |
| nal_unit_type | u(5) |
| nuh_temporal_id_plus1 | u(3) |
| nuh_reserved_zero_7bits | u(7) |
| } | |

With respect to Tables 6A-7B, one of more of the following examples definitions may be used for the respective the syntax elements.

forbidden_zero_bit shall be equal to 0.

nuh_temporal_id_plus1 minus 1 specifies a temporal identifier for the NAL unit. The value of nuh_temporal_id_plus1 shall not be equal to 0.

The variable TemporalId is specified as follows:

TemporalId=nuh_temporal_id_plus1−1 nuh_layer_id specifies the identifier of the layer to which a VCL NAL unit belongs or the identifier of a layer to which a non-VCL NAL unit applies.

nuh_reserved_zero_Xbits is reserved and should be set equal to 0 when not in use. In another example, instead of zero bits the reserved bit may be equal to 1 (e.g., nuh_reserved_one_Xbits is reserved and should be set equal to 1 when not in use).

In one example, it may be a requirement of the bitstream conformance that:

When NAL unit type is IRAP_NUT slice_type shall be I slice.

With respect to nal_unit_type, Tables 8A-8D illustrate example NAL unit types for nal_unit_type being 4, 5, or 6 bits according to the techniques herein.

TABLE 8A

| nal_unit_type u(6) | nal_unit_type u(5) | nal_unit_type u(4) | Name of nal_unit_type | Content of NAL unit and RBSP syntax structure | NAL unit type class |
|---|---|---|---|---|---|
| 0 | 0 | 0 | TRAIL_NUT | Coded slice segment of a (non-temporal access) trailing picture slice_layer_rbsp( ) | VCL |
| 1 | 1 | 1 | IRAP_NUT | Coded slice of an IRAP picture slice_layer_rbsp( ) | VCL |
| 2 | 2 | 2 | LEAD_NUT | Coded slice of a (non-temporal access) leading picture slice_layer_rbsp( ) | VCL |
| 3 | 3 | 3 | TA_NUT | Coded slice of a temporal access picture slice_layer_rbsp( ) | VCL |
| 4-32 | 4-15 | 4-7 | RSV_VCL_NUT | Reserved VCL NAL Units | VCL |
| 33 | 16 | 8 | SPS_NUT | Sequence parameter set seq_parameter_set_rbsp( ) | non-VCL |
| 34 | 17 | 9 | PPS_NUT | Picture parameter set pic_parameter_set_rbsp( ) | non-VCL |
| 35 | 18 | 10 | EOS_NUT | End of sequence end_of_seq_rbsp( ) | non-VCL |
| 36 | 19 | 11 | EOB_NUT | End of bitstream end_of_bitstream_rbsp( ) | non-VCL |
| 37 | 20 | 12 | PREFIX_SEI_NUT | Supplemental enhancement information sei_rbsp( ) | non-VCL |
| 38 | 21 | 13 | SUFFIX_SEI_NUT | | |
| 39..51 | 22-26 | 14 | RSV_NVCL | Reserved | non-VCL |
| 52..63 | 27-31 | 15 | UNSPEC | Unspecified | non-VCL |

TABLE 8B

| nal_unit_type u(6) | nal_unit_type u(5) | nal_unit_type u(4) | Name of nal_unit_type | Content of NAL unit and RBSP syntax structure | NAL unit type class |
|---|---|---|---|---|---|
| 0 | 0 | 0 | TRAIL_NUT | Coded slice segment of a non-IRAP trailing picture slice_layer_rbsp( ) | VCL |
| 1 | 1 | 1 | IRAP_NUT | Coded slice of an IRAP picture slice_layer_rbsp( ) | VCL |
| 2-32 | 2-15 | 2-7 | RSV_VCL_NUT | Reserved VCL NAL Units | VCL |
| 33 | 16 | 8 | SPS_NUT | Sequence parameter set seq_parameter_set_rbsp( ) | non-VCL |
| 34 | 17 | 9 | PPS_NUT | Picture parameter set pic_parameter_set_rbsp( ) | non-VCL |
| 35 | 18 | 10 | EOS_NUT | End of sequence end_of_seq_rbsp( ) | non-VCL |
| 36 | 19 | 11 | EOB_NUT | End of bitstream end_of_bitstream_rbsp( ) | non-VCL |
| 37 | 20 | 12 | PREFIX_SEI_NUT | Supplemental enhancement information sei_rbsp( ) | non-VCL |
| 38 | 21 | 13 | SUFFIX_SEI_NUT | | |
| 39..51 | 22-26 | 14 | RSV_NVCL | Reserved | non-VCL |
| 52..63 | 27-31 | 15 | UNSPEC | Unspecified | non-VCL |

TABLE 8C

| nal_unit_type u(6) | nal_unit_type u(5) | nal_unit_type u(4) | Name of nal_unit_type | Content of NAL unit and RBSP syntax structure | NAL unit type class |
|---|---|---|---|---|---|
| 0 | 0 | 0 | TRAIL_NUT | Coded slice segment of a non-IRAP trailing picture slice_layer_rbsp( ) | VCL |
| 1 | 1 | 1 | IRAP_NUT | Coded slice of an IRAP picture slice_layer_rbsp( ) | VCL |
| 2 | 2 | 2 | LEAD_NUT | Coded slice of a leading picture slice_layer_rbsp( ) | VCL |

TABLE 8C-continued

| nal_unit_type u(6) | nal_unit_type u(5) | nal_unit_type u(4) | Name of nal_unit_type | Content of NAL unit and RBSP syntax structure | NAL unit type class |
|---|---|---|---|---|---|
| 3-32 | 3-15 | 3-7 | RSV_VCL_NUT | Reserved VCL NAL Units | VCL |
| 33 | 16 | 8 | SPS_NUT | Sequence parameter set seq_parameter_set_rbsp( ) | non-VCL |
| 34 | 17 | 9 | PPS_NUT | Picture parameter set pic_parameter_set_rbsp( ) | non-VCL |
| 35 | 18 | 10 | EOS_NUT | End of sequence end_of_seq_rbsp( ) | non-VCL |
| 36 | 19 | 11 | EOB_NUT | End of bitstream end_of_bitstream_rbsp( ) | non-VCL |
| 37 | 20 | 12 | PREFIX_SEI_NUT | Supplemental enhancement information sei_rbsp( ) | non-VCL |
| 38 | 21 | 13 | SUFFIX_SEI_NUT | | |
| 39..51 | 22-26 | 14 | RSV_NVCL | Reserved | non-VCL |
| 52..63 | 27-31 | 15 | UNSPEC | Unspecified | non-VCL |

TABLE 8D

| nal_unit_type u(6) | nal_unit_type u(5) | nal_unit_type u(4) | Name of nal_unit_type | Content of NAL unit and RBSP syntax structure | NAL unit type class |
|---|---|---|---|---|---|
| 0 | 0 | 0 | NONIRAP_NUT | Coded slice segment of a non-IRAP picture slice_layer_rbsp( ) | VCL |
| 1 | 1 | 1 | IRAP_NUT | Coded slice of an IRAP picture slice_layer_rb sp( ) | VCL |
| 2-32 | 2-15 | 2-7 | RSV_VCL_NUT | Reserved VCL NAL Units | VCL |
| 33 | 16 | 8 | SPS_NUT | Sequence parameter set seq_parameter_set_rbsp( ) | non-VCL |
| 34 | 17 | 9 | PPS_NUT | Picture parameter set pic_parameter_set_rbsp( ) | non-VCL |
| 35 | 18 | 10 | EOS_NUT | End of sequence end_of_seq_rbsp( ) | non-VCL |
| 36 | 19 | 11 | EOB_NUT | End of bitstream end_of_bitstream_rbsp( ) | non-VCL |
| 37 | 20 | 12 | PREFIX_SEI_NUT | Supplemental enhancement information sei_rbsp( ) | non-VCL |
| 38 | 21 | 13 | SUFFIX_SEI_NUT | | |
| 39..51 | 22-26 | 14 | RSV_NVCL | Reserved | non-VCL |
| 52..63 | 27-31 | 15 | UNSPEC | Unspecified | non-VCL |

It should be noted that Table 8A provides where a single NAL unit type is used for PG-7T indicating NAL units including slices in IRAP pictures (IRAP_NUT), a single NAL unit type is used for indicating NAL units including slices in leading pictures (LEAD_NUT), a single NAL unit type is used for indicating NAL units including slices in trailing pictures (TRAIL_NUT), and a single NAL unit type is used for indicating NAL units including slices in temporal access pictures (TA_NUT). It should be noted that TA_NUT may be used to take place the place of all TSA and STSA NUTs in ITU-T H.265. That is, TA_NUT includes TSA and STSA NUTs. Table 8B provides where a single NAL unit type is used for indicating NAL units including slices in IRAP pictures (IRAP_NUT), and a single NAL unit type is used for indicating NAL units including slices in trailing pictures (TRAIL_NUT); Table 8C provides where a single NAL unit type is used for indicating NAL units including slices in IRAP pictures (IRAP_NUT), and a single NAL unit type is used for indicating NAL units including slices in trailing pictures (TRAIL_NUT), and a single NAL unit type is used for indicating NAL units including slices in leading pictures (LEAD_NUT); and Table 8D provides where a single NAL unit type is used for indicating NAL units including slices in IRAP pictures (IRAP_NUT), and a single NAL unit type is used for indicating NAL units including slices in non-IRAP pictures (NONIRAP_NUT).

In one example, with respect to the example NAL units headers, one or more of the following constraints may be applied:

It is a requirement of bitstream conformance that the value of nuh_temporal_id_plus1 shall be greater than 0.

It is a requirement of bitstream conformance that the value of nuh_temporal_id_plus1 shall be equal to 1, when the value of nal_unit_type is equal to IRAP_NUT.

In one example, according to the techniques herein semantics, e.g., slice_nal_info( ), may be included in a slice header or a slice segment header to provide information about a slice type. That is, semantics included in a slice header may be used in conjunction with the NAL unit headers described above. In one example, slice_nal_info( ) may be present in slice_header( ) illustrated in Table 4 above (e.g., slice_nal_info( ) may be present before slice_pic_parameter_set_id). Table 9 illustrates an example of slice_nal_info( ).

TABLE 9

| slice_nal_info( ) { | Descriptor |
|---|---|
|   slice_nal_info_present_flag | u(1) |
|   if(slice_nal_info_present_flag) { | |
|     if( (nal_unit_type==TA_NUT) \|\| (nal_unit_type ==TRAIL_NUT) \|\| (nal_unit_type==LEAD_NUT)) { | |
|       pic_type_info | u(1) |
|       slnr_flag | u(1) |
|     } | |
|     else if(nal_unit_type== IRAP_NUT) | |
|       irap_pic_type | u(3) |
|   } | |
| } | |

With respect to Table 9, one of more of the following examples definitions may be used for the respective the syntax elements.

slice_nal_info_present_flag equal to 1 indicates that additional information about pictures types and sub-layer no reference property is present. slice_nal_info_present_flag equal to 0 indicates that additional information about pictures types and sub-layer no reference property is not present.

pic_type_info specifies the picture type information when the nal_unit_type indicates coded slice of a trailing picture (TRAIL_NUT), or a leading picture (LEAD_NUT), or a temporal access picture (TA_NUT).

If nal_unit_type if TA_NUT the value of 0 and 1 respectively indicate temporal sub-layer access (TSA) picture and step-wise temporal sub-layer access (STSA) picture.

If nal_unit_type if LEAD_NUT the value of 0 and 1 respectively indicate random-access decodable leading (RADL) picture and random access skipped leading (RASL) picture.

If nal_unit_type if TRAIL_NUT the value of pic type info is reserved.

slnr_flag equal to 1 specifies that the picture is a sub-layer non-reference picture. slnr_flag equal to 0 indicates that the picture is a sub-layer reference picture.

irap_pic_type specifies the IRAP picture type when the nal_unit_type indicates coded slice of a IRAP picture (IRAP_NUT).

A value of 1, 2, and 3 indicates coded slice of a BLA pictures of the type BLA with leading pictures, BLA with decodable leading pictures and BLA with no leading pictures respectively.

A value of 4 and 5 indicates a coded slice of an IDR picture of the type IDR with decodable leading pictures and IDR with no leading pictures respectively.

A value of 6 indicates a coded slice of a CRA picture. Value 0 and 7 are reserved.

It is a requirement of bitstream conformance that the value of picture order count shall be equal to 0, when the value of irap_pic_type is equal to 4 or 5.

Table 10 illustrates another example of slice_nal_info( )

TABLE 10

| slice_nal_info( ) { | Descriptor |
|---|---|
|   slice_nal_info_present_flag | u(1) |
|   if(slice_nal_info_present_flag) { | |
|     if(nal_unit_type==IRAP_NUT) | |
|       irap_pic_type | u(3) |
|     else if(nal_unit_type==TA_NUT) | |
|       ta_pic_type | u(1) |
|     else if(nal_unit_type==LEAD_NUT) | |
|       lead_pic_type | u(1) |
|     if( (nal_unit_type==TA_NUT) \|\| (nal_unit_type ==TRAIL_NUT) \|\| (nal_unit_type==LEAD_NUT)) | |
|       slnr_flag | u(1) |
|   } | |
| } | |

With respect to Table 10, one of more of the following examples definitions may be used for the respective the syntax elements.

slice_nal_info_present_flag equal to 1 indicates that additional information about pictures types and sub-layer no reference property is present. slice_nal_info_present_flag equal to 0 indicates that additional information about pictures types and sub-layer no reference property is not present.

irap_pic_type specifies the IRAP picture type when the nal_unit_type indicates coded slice of a IRAP picture (IRAP_NUT).

A value of 1, 2, and 3 indicates coded slice of a BLA pictures of the type BLA with leading pictures, BLA with decodable leading pictures and BLA with no leading pictures respectively.

A value of 4 and 5 indicates a coded slice of an IDR picture of the type IDR with decodable leading pictures and IDR with no leading pictures respectively.

A value of 6 indicates a coded slice of a CRA picture. Value 0 and 7 are reserved.

When irap_pic_type is not present and nal_unit_type is equal to IRAP_NUT, the value of irap_pic_type is inferred to be equal to 4.

It is a requirement of bitstream conformance that the value of irap_pic_type shall be the same for all slices in an access unit.

ta_pic_type specifies the temporal access picture type when the nal_unit_type indicates coded slice of a temporal access picture (TA_NUT). The value of 0 and 1 respectively indicate temporal sub-layer access (TSA) picture and step-wise temporal sub-layer access (STSA) picture.

When ta_pic_type is not present and nal_unit_type is equal to TA_NUT, the value of ta_pic_type is inferred to be equal to 1.

It is a requirement of bitstream conformance that the value of ta_pic_type shall be the same for all slices in an access unit.

lead_pic_type specifies the leading picture type when the nal_unit_type indicates coded slice of a leading picture (LEAD_NUT). The value of 0 and 1 respectively indicate random-access decodable leading (RADL) picture and random access skipped leading (RASL) picture.

When lead_pic_type is not present and nal_unit_type is equal to LEAD_NUT, the value of lead_pic_type is inferred to be equal to 0.

It is a requirement of bitstream conformance that the value of lead_pic_type shall be the same for all slices in an access unit.

slnr_flag equal to 1 specifies that the picture is a sub-layer non-reference picture. slnr_flag equal to 0 indicates that the picture is a sub-layer reference picture.

When slnr_flag is not present, the value of slnr_flag is inferred to be equal to 0.

It is a requirement of bitstream conformance that the value of slnr_flag shall be the same for all slices in an access unit.

In this manner, source device 102 represents an example of a device configured to signal value for a syntax element in a network abstraction layer header indicating a network abstraction layer includes a slice of video included in an intra random access point picture; and signal a value of syntax element in a slice header indicating a corresponding type of intra random access point picture.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Data decapsulator 123 may be configured to receive and parse any of the example parameter sets described herein.

Video decoder 124 may include any device configured to receive a bitstream (e.g., a MCTS sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
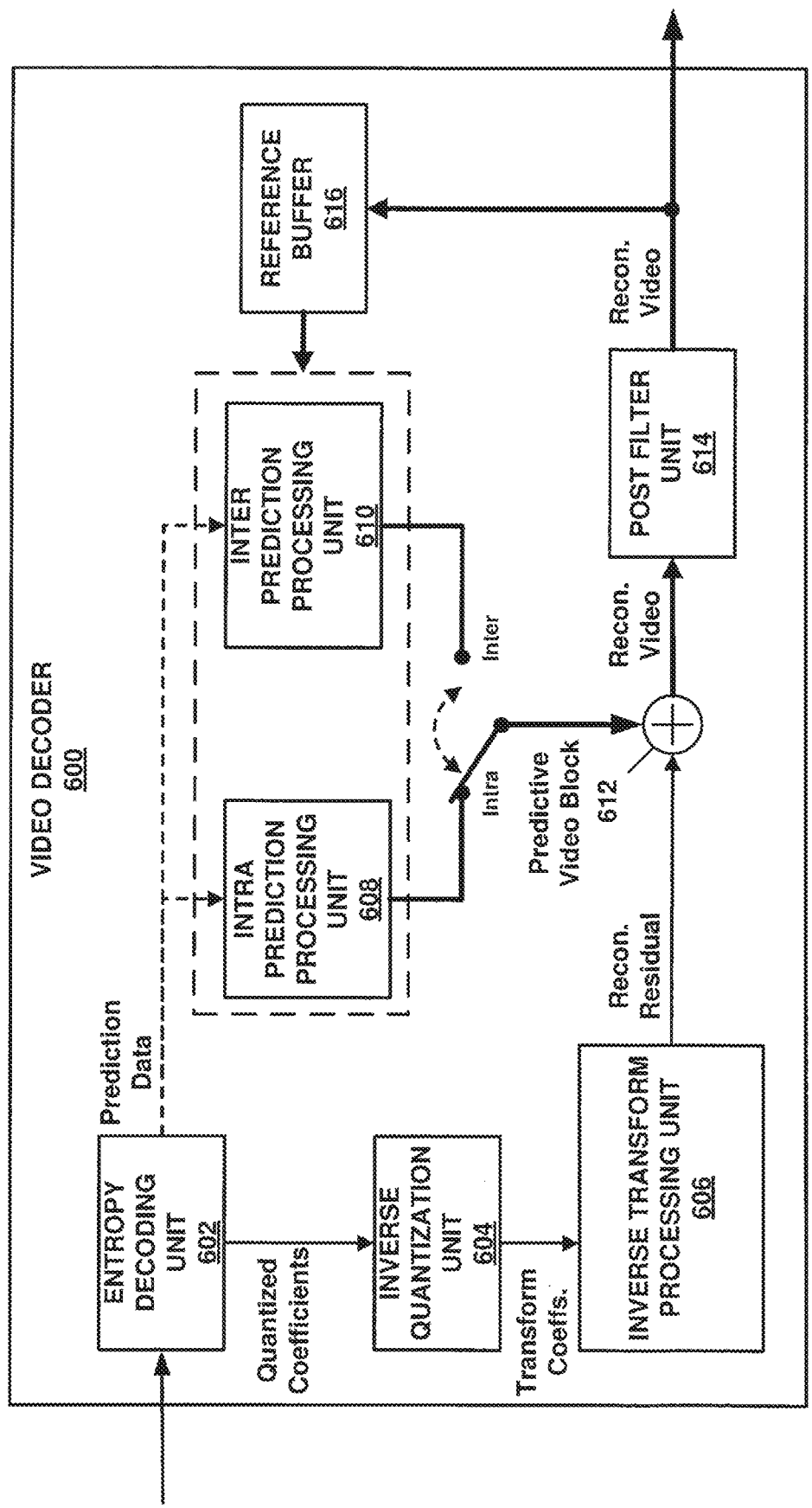
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure. In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-10. Video decoder 600 may perform video decoding based on the values of parsed syntax elements. For example, different video decoding techniques may be performed based on whether a picture is of a particular type.

In the example illustrated in FIG. 6, video decoder 600 includes an entropy decoding unit 602, inverse quantization unit and transform coefficient processing unit 604, intra prediction processing unit 606, inter prediction processing unit 608, summer 610, post filter unit 612, and reference buffer 614. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and predication data from a bitstream. In the example, illustrated in FIG. 6, inverse quantization unit and transform coefficient processing unit 604 receives a quantization parameter, quantized coefficient values, transform data, and predication data from entropy decoding unit 602 and outputs reconstructed residual data.

Referring again to FIG. 6, reconstructed residual data may be provided to summer 610 Summer 610 may add reconstructed residual data to a predictive video block and generate reconstructed video data. A predictive video block may be determined according to a predictive video technique (i.e., intra prediction and inter frame prediction). Intra prediction processing unit 606 may be configured to receive intra prediction syntax elements and retrieve a predictive video block from reference buffer 614. Reference buffer 614 may include a memory device configured to store one or more frames of video data. Intra prediction syntax elements may identify an intra prediction mode, such as the intra prediction modes described above. Inter prediction processing unit 608 may receive inter prediction syntax elements and generate motion vectors to identify a prediction block in one or more reference frames stored in reference buffer 616. Inter prediction processing unit 608 may produce motion compensated blocks, possibly performing interpolation based on interpolation filters. Identifiers for interpolation filters to be used for motion estimation with sub-pixel precision may be included in the syntax elements. Inter prediction processing unit 608 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a value for a syntax element in a network abstraction layer header indicating a network abstraction layer includes a slice of video included in an intra random access point picture, parse a value for syntax element in a slice header indicating a corresponding type of intra random access point picture, and generate video data based on values of the parsed syntax elements.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A method of decoding video data, the method comprising:

receiving a network abstraction layer unit header including syntax elements corresponding to a network abstraction layer unit, the network abstraction layer unit header consists of two bytes, a first bit of the network abstraction layer unit header is a forbidden zero bit, and a second bit of the network abstraction layer unit header is a one-bit reserved zero bit syntax element;

parsing a five bit syntax element from the network abstraction layer header specifying a type corresponding to the network abstraction layer unit, only one value specified by the five bit syntax element indicates a network abstraction layer unit type for a step-wise temporal sub-layer access (STSA) picture that enables up-switching;

parsing a three bit syntax element from the network abstraction layer header specifying a temporal identifier for the network abstraction layer unit;

parsing a six bit syntax element from the network abstraction layer header specifying an identifier of a layer corresponding to the network abstraction layer unit; and generating video data based on values of the parsed syntax elements.

2. A device for decoding video data, the device comprising one or more processors configured to:
receive a network abstraction layer unit header including syntax elements corresponding to a network abstraction layer unit, the network abstraction layer unit header consists of two bytes, a first bit of the network abstraction layer unit header is a forbidden zero bit, and a second bit of the network abstraction layer unit header is a one-bit reserved zero bit syntax element;
parse a five bit syntax element from the network abstraction layer header specifying a type corresponding to the network abstraction layer unit, only one value specified by the five bit syntax element indicates a network abstraction layer unit type for a step-wise temporal sub-layer access (STSA) picture that enables up-switching;
parse a three bit syntax element from the network abstraction layer header specifying a temporal identifier for the network abstraction layer unit;
parse a six bit syntax element from the network abstraction layer header specifying an identifier of a layer corresponding to the network abstraction layer unit; and
generate video data based on values of the parsed syntax elements.

3. The method of claim 1, wherein the five bit syntax element has a value of 3 indicating the network abstraction layer unit type for the STSA picture that enables up-switching.

4. The method of claim 1, wherein the five bit syntax element has a value of 4 indicating a reserved value for a video coding layer network abstraction layer unit.

5. The device of claim 2, wherein the five bit syntax element has a value of 3 indicating the network abstraction layer unit type for the STSA picture that enables up-switching.

6. The method of claim 2, wherein the five bit syntax element has a value of 4 indicating a reserved value for a video coding layer network abstraction layer unit.

* * * * *